Patented Aug. 30, 1938

2,128,672

UNITED STATES PATENT OFFICE 2,128,672

PRINTING INK

Albert E. Gessler, Yonkers, N. Y., assignor, by mesne assignments, to Interchemical Corporation, Cincinnati, Ohio, a corporation of Ohio No Drawing. Application March 17, 1934, Serial No. 716,178

1 Claim. (Cl. 134—35)

In my co-pending application Serial No. 622,453, filed July 14, 1932, Patent No. 2,087,190, issued July 13, 1937, I have described and claimed a printing ink, unusual characteristics and adaptabilities comprising a coloring material incorporated in a vehicle which is practically non-volatile at approximately room temperatures but which is highly volatile, or whose vapor pressure increases very rapidly, at elevated temperatures. The preferred vehicles described and claimed in the aforementioned application are those containing solvents which possess physical properties like those characteristic of diethylene gycol monobutyl ether, which not only impart to the ink superior printing qualities but which, when the prints are subjected to heat, cause them to dry almost instantaneously.

Such vehicles as are above described have the advantage that they may be formed into inks which can be handled with facility and which are so free from highly volatile solvents that they do not dry at room temperatures or on the printing plates or in the fountain of the press, but which will dry so quickly when subjected to elevated temperatures that prints made from them are dry as soon as they have passed through the drying apparatus at the delivery end of the printing machine on which they are used. This, of course, results in large savings in time, labor, power and equipment as it enables the prints to be printed immediately on the reverse side and to be packed and shipped without the necessity of the storing and drying operations usually required after the prints have been made. Successive sheets of material will not offset or stick together because each ink film dries practically instantaneously. Thus, there can be no smudging due to the wetness of the print.

The superior printing qualities of inks formed from such vehicles are undoubtedly due to the excellent characteristics of viscosity, tack, covering power, resistance to absorption, etc., which are imparted to the inks by the solvents and other materials used. These enable less ink to be used for a given coverage than is the case with ordinary ink, due to the fact that the ink is non-absorbent, and cause the elimination of "halo", which is a term used in the printing industry to characterize the tendency of an ink to move outwardly from the point at which it has been applied, and thus form irregular markings upon the surface printed upon.

Many printing presses, and especially those used for fine printing, are equipped with a very sensitive type of ink-distributing rollers, carrying the ink from the fountain to the printing plates and consisting generally of mixtures of glue, glycerine and water or similar materials. If these rollers are used with the printing ink of my said co-pending application, they are subject to deterioration by reason of the tendency of the ink to extract some of their constituent substances. This is explained by the fact that the solvents used in the preparation of the ink are miscible with water and/or gylcerine or glycerine substitutes, and during their use with such ink-distributing rollers a slow extraction or exchange of these substances from the roller material takes place and the rollers eventually are rendered hard and inelastic and unable to carry and distribute the ink evenly and satisfactorily over the printing plates.

It will be apparent that the full benefits and advantages of the printing ink described and claimed in my aforesaid application cannot be availed of on presses equipped with ink-bearing rollers of the type referred to. It is, therefore, an object of the present invention to prepare an ink which is adapted for use with rollers made from glue, water and glycerine or similar mixtures.

With ink-bearing rollers of this type, therefore, I have found it advantageous to use an ink which will not extract substances from them, particularly water, glycerine, or its substitutes. In order to assure this, it is important that the solvents employed in the ink should be such that they inherently have a limited affinity for water, glycerine or glycerine substitutes. Then by small additions of these substances, the remaining demands of the ink for them may be satisfied. With such an ink substantially no water or glycerine will be taken up from the rollers. The amount of such additions should, however, not be so great as to disturb the printing qualities of the ink nor will such excess addition be necessary where the proper solvent is employed.

I have found that certain organic esters possess these desirable qualities, and are quite satisfactory for use as solvents in vehicles for the printing inks required for such ink-bearing rollers or contact bodies as are above described. For instance, diethylene glycol monobutyl ether, which is a solvent particularly well adapted to dissolve certain low viscosity cellulose compounds such as nitrocellulose, or natural or synthetic resins, if converted into its esters—for example, its acetate—will have these qualities, yet the resultant compound possesses vapor pressure and other desirable characteristics very similar to those possessed by the original ether, and enables the same great advantages to be obtained when used as a solvent in the preparation of a printing ink.

It should be understood that for the purposes of the present invention, all those solvents of soluble cellulose compounds and resins are included which have similar chemical and physical properties as the above described ester.

It should be noted that the water, glycerine, etc., or mixtures of substances which when extracted from a roller of the type described will render it unfit for use, is in amount relatively small as compared with the total composition of the roller, and the deleterious effect is apparently due to the removal of these substances at the surface. Consequently, if the ink possesses even a slight affinity for these substances they will be slowly extracted from the surface of the rollers and a gradual hardening of the rollers will take place. It will be seen, therefore, that the ideal condition to be obtained is one wherein there is an exact balance between the desire of the ink to take up these substances and the amount thereof which are supplied to satisfy this desire.

Inks containing organic solvents of this character have the same qualities and novel features in general as the inks described and claimed in application Serial No. 622,453, improved by the additional quality and feature of not attacking and unduly destroying the sensitive ink-bearing rollers of the type referred to.

As a specific example of the preparation of my novel ink, the following is given:

35 parts of low viscosity nitrocellulose are dissolved in 55 parts of monobutyl ether of diethylene glycol acetate and 10 parts of dibutyl phthalate. This solution may be heated to drive off impurities, and a small amount, say 1%, of water and glycerine added. The ink is then prepared by grinding or otherwise dispersing a pigment, such as 100 parts of chrome yellow, in the solution. It will, of course, be recognized that the yellow pigment may be replaced by any suitable pigments or dyestuffs and/or mixtures thereof; that the binder, nitrocellulose, may be replaced by other binders, such as other cellulose compounds and/or mixtures thereof and/or by natural or synthetic resins. Moreover, the dibutyl phthalate may be replaced by any other suitable agent, such as tricresyl phosphate or the like, effective to prevent brittleness in the finished product and to repress the vapor pressure of the solvent media at room temperatures. If desired, 10 parts of castor oil may be added to the vehicle in order to give softness and flexibility to the ink coating. The monobutyl ether of diethylene glycol acetate may be replaced by other solvents, or solvent mixtures, possessing a similarly low rate of evaporation at ordinary temperature and a marked acceleration of the volatility at raised temperatures, and possessing a similar substantial lack of affinity for water and/or glycerine, or glycerine substitutes.

One important property of diethylene glycol monobutyl ether acetate is its vapor pressure characteristic. The vapor pressure of this solvent at 20° C. is similar to, and even less than, that of diethylene glycol monobutyl ether, the solvent specified in applicant's first application (that is to say, it is less than 0.02 mm. of mercury, according to Brewer and Gardner, Industrial and Engineering Chemistry, vol. 29, No. 2, p. 179, February, 1937), and its vapor pressure at 150° C. approximates the vapor pressure of ethyl alcohol at ordinary temperatures (about 40.0 mm. of mercury). This vapor pressure at elevated temperatures contrasts sharply with the vapor pressures of high boiling "plasticizers" such as dibutyl phthalate, a minor proportion of which is used in the specific example. The vapor pressure of this liquid (according to Brewer and Gardner) is 0.45 mm. at 100° C. and 1.4 mm. at 150° C.

Another important property of diethylene glycol monobutyl ether acetate is its substantial lack of affinity for water and glycerine, which distinguishes it not only from hygroscopic organic solvents, but also from those which, while not truly hygroscopic, are water-miscible. Otherwise, the present ink is similar to the ink of my co-pending patent referred to above. It has the consistency of ordinary oil-varnish printing ink, is stable on the press, and yet dries instantly when heated following the printing operation.

It will be seen that an ink made in accordance with the principles hereinbefore set forth is distinctly superior to the ordinary types of inks made by grinding pigments in the usual types of oils or oil varnishes. Such oils or varnishes are characterized by their relatively slow rate of drying due to polymerization, oxidation and/or absorption and as a consequence cause considerable difficulty in printing processes by delaying the speed of operation.

It will also be noted that the quick drying ink of the present invention is distinct from and superior to the ordinary type of oil ink in which the driers or drying accelerators are incorporated, as the usual accelerating means are not sufficiently rapid in accomplishing the desired result of instantaneous drying. The ink of the present invention, moreover, is not to be confused with lacquers as the latter have the predominant characteristic of high volatility at room temperatures (due to the highly volatile solvents employed) as contrasted with the substantially non-drying nature of my novel ink at room temperatures; and such lacquers also lack the qualities of tack and viscosity, characteristic of printing ink, possessed by my ink, because they employ solutions of relatively low solids concentration as contrasted with the relatively high solids concentration of my ink.

It will be noted further that substances like dibutyl phthalate referred to in the above example, are desirable not only because of their capacity for dissolving cellulose compounds but also because of their tendency to prevent the brittleness characteristic of a film consisting of nitrocellulose or resins alone. This type of solvent possesses a very low vapor pressure over a wide range of temperature and is practically non-volatile if exposed to the heat necessary for the process. It will be seen, therefore, that this type of solvent is desirable as an aid to plasticizing the film obtained after the main solvent has evaporated. Furthermore, as above indicated, such solvents have a negligible vapor pressure at ordinary temperatures and at the same time exert a repressing action on the other solvents and may be admixed with such other solvents in order to reduce or repress the normal vapor pressures of such other solvents at room temperature. Thus, the dibutyl phthalate referred to in the example as illustrative, or other plasticizers such as tricresyl phosphate, triacetine, castor oil or the like, will be seen to be of considerable importance by reason of the fact that their characteristically low vapor pressures at ordinary temperature (these solvents have no appreciable vapor pressure at room temperature) make them admirably suited for intermixture in proper proportions with solvents whose vapor pressures at room temperature may be somewhat higher than would ordinarily qualify them for use alone as solvents in my novel printing ink; and the rate of evaporation of the mixture may thus be regulated so that it falls within the preferred range indicated.

By "room temperatures" as used in this specification, I mean the ordinary or normal temperatures of a room in which people live and work. This is generally agreed to be temperatures from approximately 20° C. to approximately 25° C.

With ink prepared as above, the printing operation may be carried out in the ordinary manner and at ordinary temperatures. At the conclusion of the printing operation, the printed materials may be subjected, by means of suitable drying equipment, to sufficient heat to dry the thin film of the print very rapidly. Thus, a finished print is obtained immediately at the end of the printing and heating operation and no time, labor, nor material is wasted in delays incident to the prolonged drying of the printed goods under the processes at present in use. Coating the prints with paraffin or similar compounds, in order to enable them to be immediately printed on their reverse side, and the disadvantages concomitant therewith, are eliminated by the process of this invention.

The novel ink and process described above are not only capable of utilization in printing upon paper, but they are also adapted for use in making very satisfactory prints upon many other surfaces, such as, for instance, textiles or metallic surfaces, or the lacquered surfaces of Cellophane, or the like.

It is apparent that such an ink as has been described does not necessitate the admixture of driers, does not set or harden on the printing rollers or plates, but is yet capable of being dried very quickly when subjected to suitable temperatures after being printed, by the evaporation of the solvent from the thin layer of the print. The finished products are flexible prints in which the pigment is well protected against being rubbed off. They are not softened by moisture, grease, or most chemical influences and possess practically no odor.

What I claim is:

A printing ink adapted for printing presses having rollers of the glue, glycerine and water type, which is substantially non-drying on the press at ordinary temperatures and dries rapidly at 150° C., consisting of coloring matter dispersed in an organic viscous vehicle consisting of a liquid component and a solid component—being a member of the group consisting of natural and synthetic resins and cellulose compounds—dissolved in the liquid component in sufficient quantity to give the ink the consistency of an ordinary printing ink, in which the major part of the liquid component is diethylene glycol monobutyl ether acetate.

ALBERT E. GESSLER.